United States Patent [19]
Lavin et al.

[11] Patent Number: 5,909,360
[45] Date of Patent: Jun. 1, 1999

[54] UNINTERRUPTIBLE POWER SUPPLIES

[75] Inventors: James Vincent Lavin, Glasgow; Alastair Stanley, Londniddrie, both of United Kingdom

[73] Assignee: Magnum Power Solutions Limited, Livingston, United Kingdom

[21] Appl. No.: 08/875,197

[22] PCT Filed: Jan. 18, 1996

[86] PCT No.: PCT/GB96/00103

§ 371 Date: Aug. 26, 1997

§ 102(e) Date: Aug. 26, 1997

[87] PCT Pub. No.: WO96/22627

PCT Pub. Date: Jul. 25, 1996

[30] Foreign Application Priority Data

Jan. 18, 1995 [GB] United Kingdom ............... 9500969

[51] Int. Cl.[6] ............... H02M 3/335; H02H 7/122; H02J 1/00

[52] U.S. Cl. ............... 363/21; 363/89; 363/56; 307/86; 307/87; 307/45

[58] Field of Search ............... 363/21, 34, 37; 307/66, 48, 87; 320/21

[56] References Cited

U.S. PATENT DOCUMENTS

| | | |
|---|---|---|
| 4,238,690 | 12/1980 | Clarke ........................... 307/44 |
| 4,395,639 | 7/1983 | Bring . |
| 4,510,400 | 4/1985 | Kiteley . |
| 4,564,767 | 1/1986 | Charych . |
| 4,672,228 | 6/1987 | Swoboda . |
| 4,672,293 | 6/1987 | Crampton . |
| 4,729,083 | 3/1988 | Kyriakos . |
| 4,745,299 | 5/1988 | Eng et al. . |
| 5,424,936 | 6/1995 | Reddy . |
| 5,513,088 | 4/1996 | Willimson ........................... 363/20 |
| 5,781,422 | 7/1998 | Lavin et al. . |

FOREIGN PATENT DOCUMENTS

WO-A-9107803  5/1991  WIPO ............... H02J 9/06

*Primary Examiner*—Peter S. Wong
*Assistant Examiner*—Rajnikant B. Patel
*Attorney, Agent, or Firm*—Gregory L. Roth

[57] ABSTRACT

An uninterruptible power supply which is advantageous for use with a computer receives power alternatively from a utility main power source or a rechargeable battery. The uninterruptible power supply includes an input for receiving AC utility power, an AC to DC converter coupled to the input, receiving AC power from the input, having at least one regulated D.C. output, and generating DC power at an output of the converter, a transformer having a primary winding and a secondary winding, an inverter coupled between the AC to DC converter and the primary winding of the transformer and arranged to supply a chopped DC voltage to the primary winding to cause a corresponding chopped DC voltage having an amplitude $V_s$ to be generated across a secondary winding of the transformer coupled to the output, an auxiliary power supply having an energy store having a supply terminal that is operable at a voltage $V_b$, and a diode isolation circuit coupled between a supply terminal of the energy store and the secondary winding. The diode isolation circuit is arranged to be in a non-conductive state when $V_b$ is greater than $V_b$ to isolate the energy store from the secondary winding and in a conductive state when $V_b$ is greater than $V_s$ to supply current through the diode isolation means to the secondary winding.

12 Claims, 10 Drawing Sheets

Simplified Schematic of Practical Automatic UPS

Output Connections for Converters with Energy Transfer Capacitors on Secondary

Alternative Output Connections for Converters with Energy Transfer Capacitors on Secondary Note in all cases
The Power Switch is Connected to an Output Winding Appropriate to the Battery Voltage

Output Connections for Double Sided Converters

Output Connections for Single Side Converters

UNINTERRUPTIBLE POWER SUPPLIES

The present invention relates to uninterruptible power supplies and in particular, though not necessarily, to uninterruptible power supplies for computers.

Uninterruptible power supplies are required for many applications where the loss of mains power has serious implications. For example, where computer systems are used to transfer large amounts of data over a network it is essential that a backup power supply is available in the event that mains power is lost in order to prevent the loss of valuable information.

Early uninterruptible power supplies were generally placed between a standard AC utility outlet and the AC input socket of an electrically powered device. Such power supplies typically included an AC to DC converter for converting received AC power into DC power to charge a battery and an DC to AC converter for reconverting the DC power back into AC power for supply to the AC input socket of the electrical device. This resulted in considerable duplication of circuitry as an AC to DC converter was also included in the integral power supply of the electrical device.

GB 2,120,474A describes a standby power supply system intended to be integrated into an internal power supply of an electrical device and which is intended to reduce the above noted duplication of circuitry which arose with previous uninterruptible power supplies. The system includes an AC to DC converter and an inverter circuit which is used to couple chopped DC power through a transformer into a set of secondary windings arranged to provide regulated DC output voltages for internal use by the electrical device. A battery is coupled via a tertiary winding of the transformer to the secondary windings and is arranged to provide electrical power to the secondary windings when the input AC voltage fails. However, the additional winding required to couple the battery to the secondary windings results in increased manufacturing costs and an increase in the overall size of the system.

EPO,243,061 describes a power supply system similar to that of GB2,120,474A where the battery is coupled to the tertiary winding via a diode. The circuit is arranged so that, under normal operating conditions the diode is reverse biased, isolating the battery from the tertiary winding. However, when the AC voltage drops, resulting in a corresponding drop in voltage across the tertiary winding, the diode becomes forward biased providing power from the battery to the tertiary winding.

Document WO 91/07803 describes an uninterruptible power supply in which the battery is coupled directly to one of the secondary windings of the transformer to couple power directly to the corresponding output. Power is also reflected through the transformer, from that secondary winding, to the other secondary windings to provide DC power to the other DC outputs. Whilst this power supply of WO 91/07803 results in a considerable simplification in the power supply circuitry, and to a reduction in the size of the supply, there remains a need to provide a simpler and cheaper power supply system.

It is an object of the present invention to overcome or at least mitigate certain of the disadvantages of known uninterruptible power supplies.

According to the present invention there is provided an uninterruptible power supply comprising:

an input for receiving AC utility power;

an AC to DC converter coupled to the AC input and arranged to generate DC power at an output of the converter;

a transformer;

an inverter coupled between the AC to DC converter and a primary winding of the transformer and arranged to supply a chopped DC voltage to the primary winding, so that a corresponding chopped DC voltage, having an amplitude $V_s$, is generated across a secondary winding of the transformer coupled to said output;

an auxiliary power supply comprising energy storage means operable at a voltage $V_b$; and diode isolation means coupled between a supply terminal of the energy storage means and said secondary winding, wherein the diode isolation means is arranged to be in a non-conductive state when $V_s$ is greater than $V_b$ to isolate the energy storage means from the secondary winding and in a conductive state when $V_b$ is greater than $V_s$ to supply current through the diode isolation means to the secondary winding.

Using the arrangement of the present invention, there is no need for an extra transformer winding, or transformer, to couple the energy storage means to the regulated DC output (s) through the secondary winding(s). There is also no need for complex comparison means for detecting a critical drop in AC utility input.

Preferably the auxiliary power supply comprises an inverter coupled between the energy storage means and said secondary winding of the transformer, the inverter being in series with the diode isolation means and being arranged to supply a chopped DC voltage to said secondary winding when the diode isolation means is in a conducting state. Where the power supply comprises a pulse width modulation controller for providing a variable duty cycle control signal to the first mentioned inverter in order to regulate the output voltage from the power supply, the auxiliary power supply inverter may also be controlled by the same control signal. The auxiliary power supply inverter may comprise a FET, preferably a MOSFET, or another suitable semiconductor switch.

Typically, where the energy storage means is a battery, a battery capacitor is coupled in parallel with the battery, close to the power switch, for the purpose of providing current pulses to the secondary winding when the diode is forward biased. Thus, the current drawn from the battery is substantially DC and noise radiation is kept to a minimum allowing the battery to be located remotely from the inverter or power switch. In one embodiment of the invention, the capacitor is coupled directly across the battery terminals, between the battery and the diode isolation means. However, in an alternative embodiment, the diode isolation means is coupled between the battery and the battery capacitor. This latter configuration results in the capacitor charging up to a voltage higher than the battery voltage, via the secondary winding, and a peak charging circuit, when the diode isolation means is in a non-conducting state. This allows the battery to be charged by a battery charger connected to the battery capacitor. The necessity for coupling a battery charger independently to a DC output of the supply via an additional winding is therefore eliminated. A further advantage is that the reduced power requirements made upon the diode allow the diode to be smaller and cheaper, and allow it to be positioned remotely from the main power supply components, e.g. together with a battery pack.

Preferably, a thermistor is coupled between the AC input and the primary winding of the transformer. More preferably, the thermistor is coupled between the rectifier of the AC to DC converter and the smoothing or hold-up capacitor. The thermistor is a resistor whose resistance decreases with increasing temperature. When the AC utility power level is normal, the current flowing through the thermistor maintains it in a high temperature, low resistance state. However, following loss of AC power for a prolonged period, the thermistor temperature falls and its resistance rises to a relatively high level. When the AC power is subsequently reapplied the high resistance of the thermistor limits the inrush current into the hold-up capacitor. This enables the changeover from the auxiliary power supply to the main power supply to be conducted in an orderly manner.

For a better understanding of the present invention and in order to show how the same may be carried into effect reference will now be made, by way of example, to the accompanying drawings in which:

FIGS. 5(a) to 5(f) show alternative circuits for implementing an auxiliary power supply power switch of the uninterruptible power supplies of FIGS. 1 and 4;

FIGS. 6(a) to 6(f) show six alternative configurations for the transformer secondary side circuits of the uninterruptible power supplies of FIGS. 1 and 4;

FIGS. 7 (a) to (c) illustrate a modification of the power supply of FIGS. 1 and 4;

Figure 1:
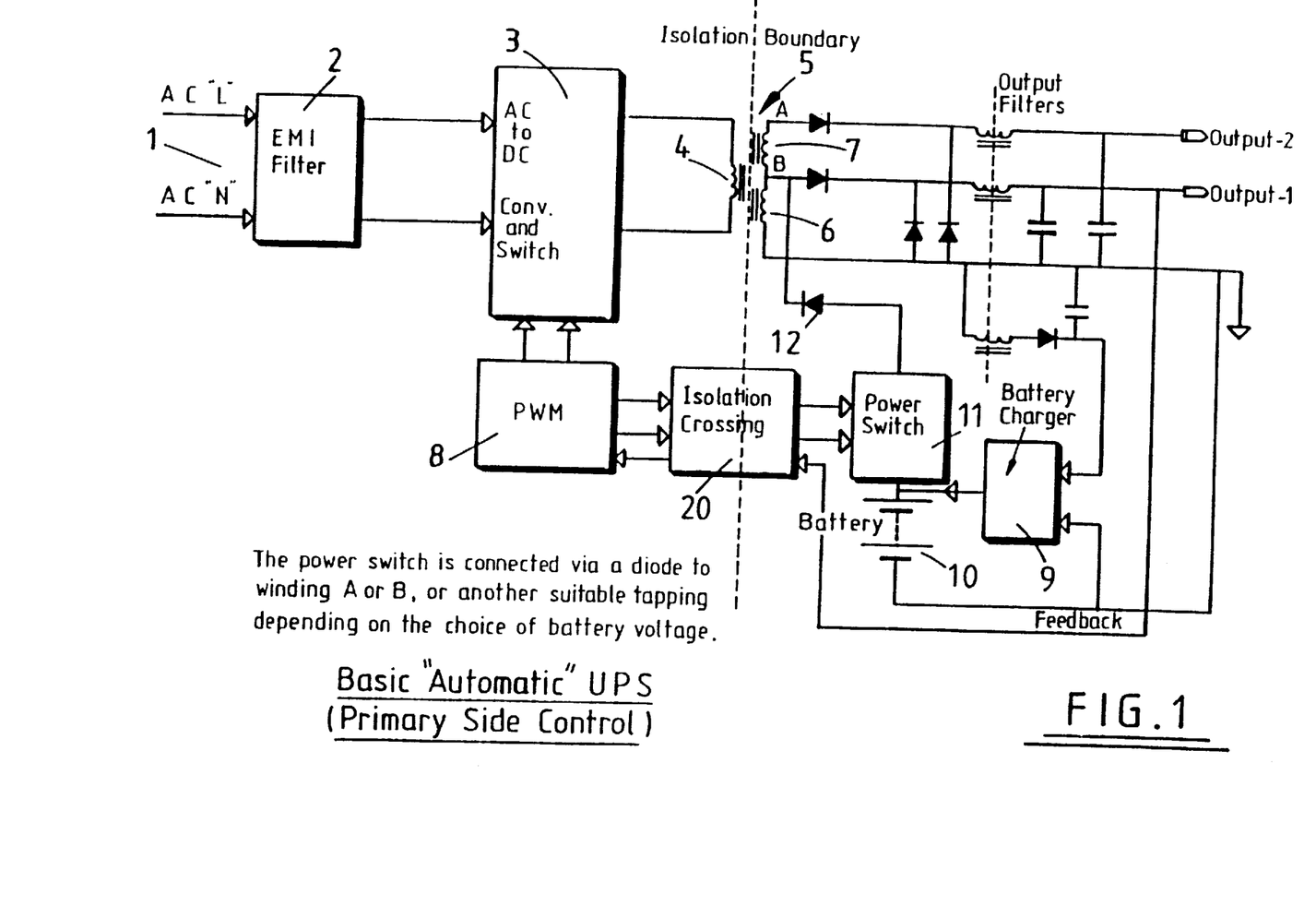
FIG. 1 shows in schematic form an automatic uninterrupted power supply having a primary side pulse width modulation controller.

There is shown in FIG. 1 an uninterruptible power supply (UPS) having an auxiliary power supply which "cuts-in" to replace a failed AC utility power supply.

The UPS has an input 1, comprising live and neutral input lines L,N, for receiving AC utility power from a mains socket. An electromagnetic interference (EMI) filter 2 is coupled to the AC input 1 to prevent switching noise being coupled back from the power supply into the mains supply. AC power transmitted through the EMI filter 2 is coupled to an AC to DC converter and switch unit 3 which provides at its output a chopped DC voltage, typically having an amplitude between 130 and 400 Volts, for example 384 Volts. This chopped DC voltage is fed into the primary winding 4 of a transformer 5 such that corresponding chopped voltages are induced on a pair of interconnected secondary windings 6,7 of the transformer 5. The induced voltages are rectified and smoothed to provide regulated DC output voltages, typically less than 50V, for example 3.3V and 5V at output_1 and output_2 of the power supply.

The unit 3 which generates the chopped DC voltage for application to the primary winding 4 of the transformer 5 includes a switch which is controlled by a pulse width modulation controller 8 which varies the duty cycle of the chopped signal in order to maintain the voltage at output_1 and output_2 at the correct levels. This is achieved by a feedback signal taken from output_1 and delivered to the controller 8 where it is compared against a reference value. The feedback signal is delivered to the controller 8 via an isolation circuit 20.

Power is inductively coupled from inductive filters, forming part of the smoothing circuit at the output side of the transformer 5, to a battery charger unit 9 which supplies power to maintain a battery 10 in its fully charged state. The positive terminal of the battery 10 is coupled through a power switch 11 and a commutation diode 12, which forms a diode isolation means, to the tap connecting the two secondary windings 6, 7. The power switch 11 functions in the same way as the switch of the unit 3 to provide a chopped DC output from the battery 10 and is controlled by the same pulse width modulation controller 8 that is used to control the unit 3. The switching signal from the controller 8 is delivered to the switch 11 via the isolation circuit 20.

During normal operation, when the AC input to the power supply is maintained at its regulated level, the primary winding 4 of the transformer 5 is supplied with a chopped DC voltage of amplitude 384V. For a turns ratio of 24:1 for the primary winding 4 with respect to the secondary winding 6, a corresponding chopped voltage $V_s$ of amplitude 16V is induced on the secondary winding 6. With a 12V battery $V_b$, the commutation diode 12 is therefore reverse biased by a voltage of 4V. The pulse width modulation controller 8 is arranged to have a nominal duty cycle of 0.24 so that the output_1 of the power supply provides a 3.3V DC volt output.

As the pulse width modulation controller 8 drives the switch of unit 3 and the power switch 11 in synchrony, both switches are off at the same and, when they are both on, the commutation diode 12 prevents power from being drawn from the battery to supply output_1 and output_2.

When the AC utility supply fails, the voltage induced on the secondary winding 6 of the transformer will fall and in an effort to compensate for this the duty cycle of the controller will rise. When the voltage across the secondary winding 6 drops below 11.5V (allowing for the diode drop) the commutation diode 12 is forward biased and current is supplied from the battery 10 to the tap between the secondary windings 6, 7. This 11.5V threshold voltage is reached when the duty cycle has risen to approximately 0.33. The current delivered by the battery 10 flows directly to output_1 and indirectly via secondary winding 7 to output_2. Thus the feedback signal for the controller 8 is re-stabilised and control of the switch 11 is re-established to maintain output_1 and consequently output_2 at the correct level. Additionally, current flowing through the secondary windings 6 and 7 induces a voltage via the transformer core across the primary winding 4 so that any energy storage facility within unit 3 (see below) is at least partly re-charged despite the absence of energy from the utility supply 1.

Figure 2:
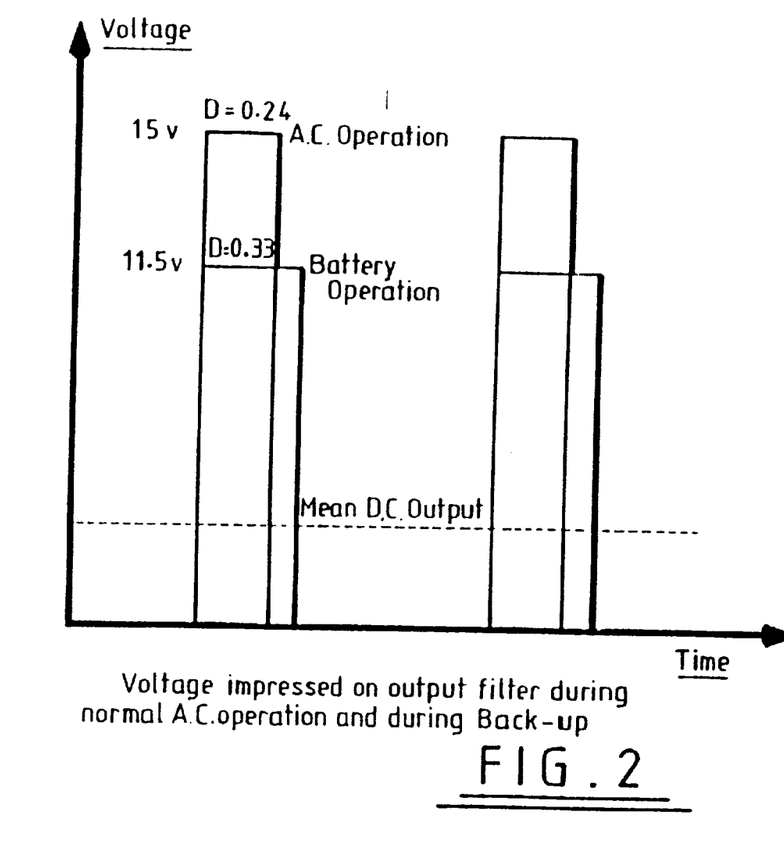
FIG. 2 shows typical chopped DC waveforms present on a secondary winding of a transformer of the power supply of FIG. 1.

FIG. 2 shows the chopped 16V DC voltage present on the secondary winding 6 when the power supply is functioning normally. As the AC utility supply begins to fall, the pulse width modulation controller 8 increases the duty cycle of the chopped voltage supplied to the primary winding in order to maintain the DC output voltages at their correct levels. When the duty cycle reaches 0.33, corresponding to a DC voltage amplitude on the secondary winding 6 of 11.5V, the commutation diode 12 becomes forward biased and conducts power from the battery 10 to the supply outputs as described above. The system is designed so that the maximum duty ratio (0.33) during AC operation (at minimum AC voltage) is numerically less than the minimum duty ratio (say 0.35) when operating on a fully charged battery.

Figure 3:
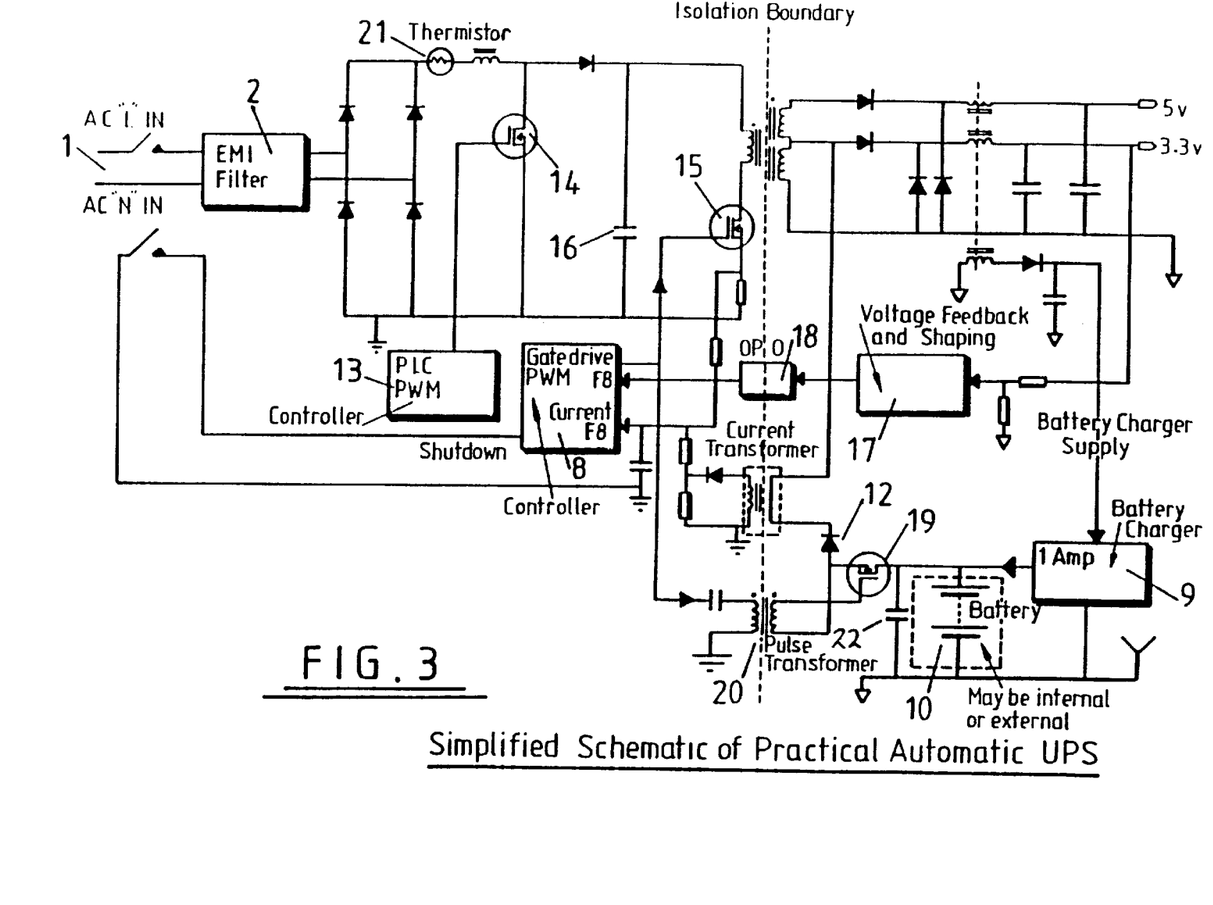
FIG. 3 shows in more detail the uninterrupted power supply of FIG. 1.

FIG. 3 shows in more detail the power supply of FIG. 1. Power transmitted through the EMI filter 2 is full wave rectified by a four diode arrangement and is supplied to a DC to DC forward converter 15 through a power factor corrected (PFC) pre-regulator. The PFC pre-regulator comprises a second pulse width modulation controller 13 operable to switch a FET 14 on and off to maintain a substantially constant voltage of approximately 384V on an energy storage capacitor 16.

The forward converter comprises a second FET 15 coupled in series with the primary winding 4 of the transformer 5, the gate of the FET being controlled by the first pulse width modulation controller 8. The capacitor 16 is connected across the series coupled primary winding 4 and FET switch 15 and acts as a "hold-up" capacitor to maintain the DC voltage supplied to the transformer for a short period following a drop in AC utility power.

As described above, the secondary windings 6,7 are coupled to respective DC regulated output terminals via respective pairs of rectifying diodes and filters. A signal from output_1 (3.3V) is fed back to the first pulse width modulation controller 8 via a voltage feedback and shaping circuit 17 and an opto-isolator 18 and the pulse width modulation controller 8 varies the duty cycle of the FET switching signal to maintain the DC output voltages at their regulated levels.

The power switch 11 which is coupled between the positive terminal of the battery 10 and the commutation diode 12 is formed by a circuit arrangement which in this embodiment comprises a FET 19, the gate of which is driven by the pulse width modulation controller 8 through an isolation transformer 20. A capacitor 22 is coupled in parallel across the terminals of the battery 10 and provides pulse current to the secondary winding 6 when the diode 12 is forward biased. The capacitor 22 is charged by DC current drawn from the battery. As the battery supplies substantially only DC current, it can be located remote from the power switch 11 without generating significant levels of electromagnetic interference.

A current feedback signal for the controller 8 to regulate the rate of change of the duty cycle is either supplied from FET 19 via a current transformer or from a sense resistor connected to the FET 15 on the primary side of the transformer, depending upon which energy source is supplying the transformer.

A thermistor 21 is connected between the full wave rectification circuit and an inductor of the PFC pre-regulator. The thermistor has a relatively low resistance when current is flowing through it and it is hot, and a relatively high resistance when that current ceases and its temperature falls. Following failure and subsequent reconnection of the AC supply, the thermistor remains relatively cool for a short period of time during which it has a relatively high resistance. This high resistance prevents a rapid inrush of current from the AC input 1 to the PFC pre-regulator and allows the "hold-up" capacitor to charge up in a smooth, orderly way until a point is reached where the amplitude of the chopped signal on the secondary winding 6 exceeds 11.5V, shutting off the auxiliary supply via diode 12 and supplying power to the regulated DC outputs from the AC input.

An additional signal is required to stop the controller 8 when the utility supply 1 is purposely switched off. This inhibits commencement of back-up operation via diode 12 and is accomplished by auxiliary contacts on the primary ON/OFF switch for the utility supply.

Figure 4:
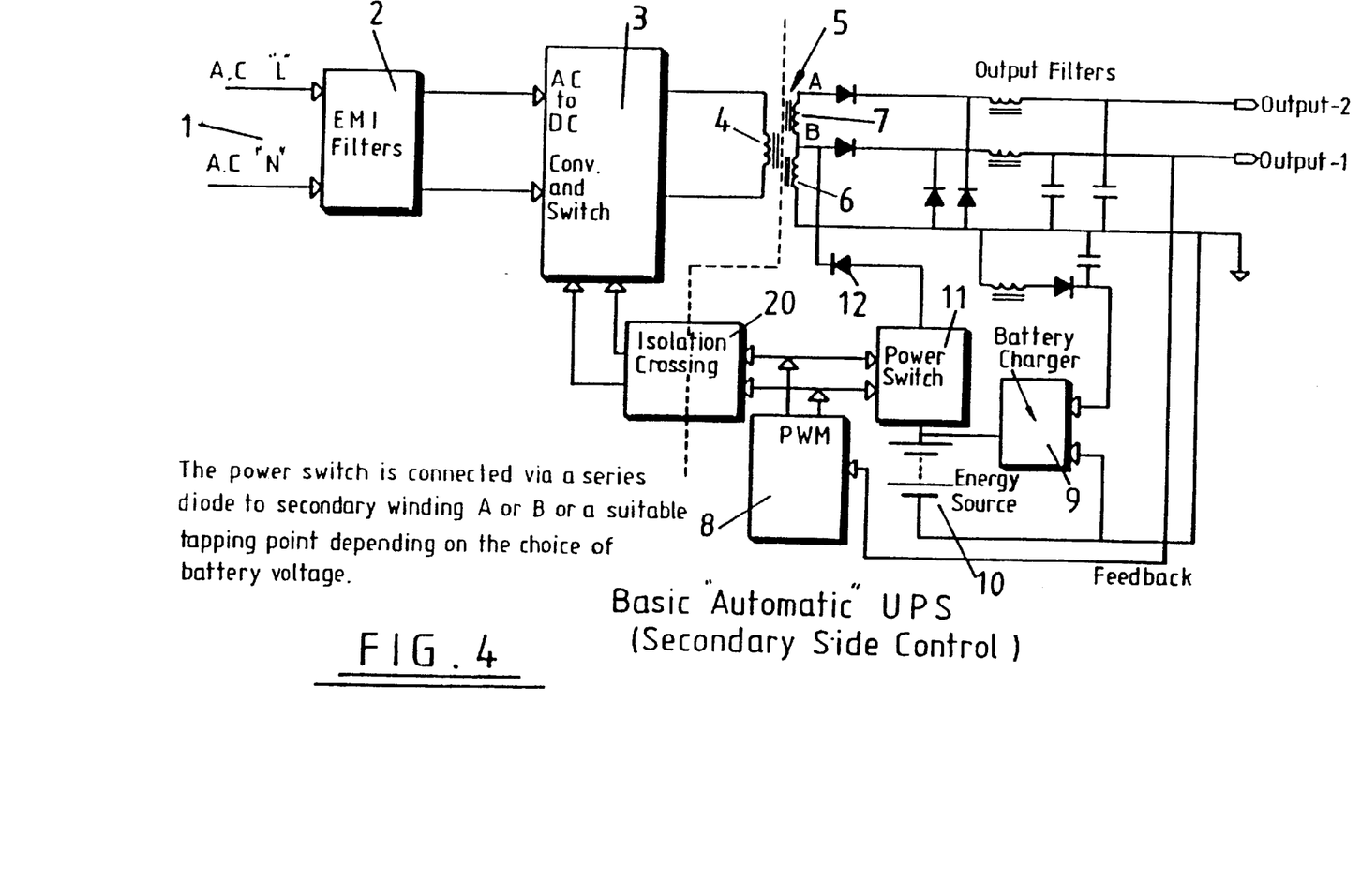
FIG. 4 shows an automatic uninterrupted power supply having a secondary side pulse width modulation controller.
Figure 5A:
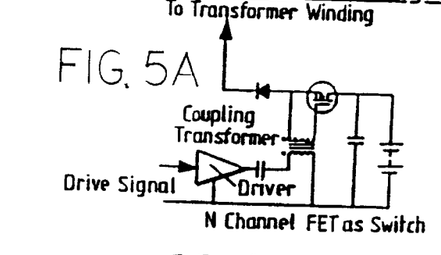
Figure 5B:
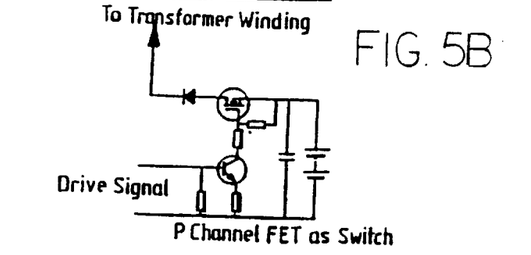
Figure 5C:
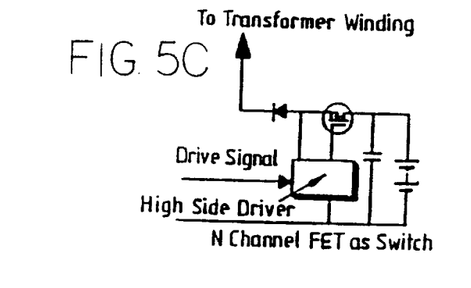
Figure 5D:
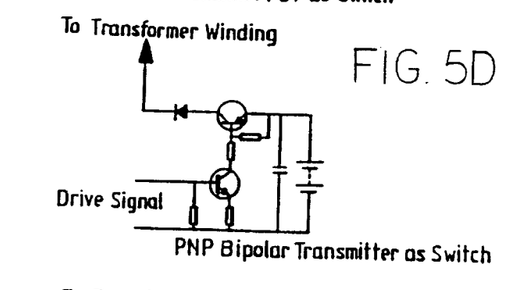
Figures 5E, 5F:
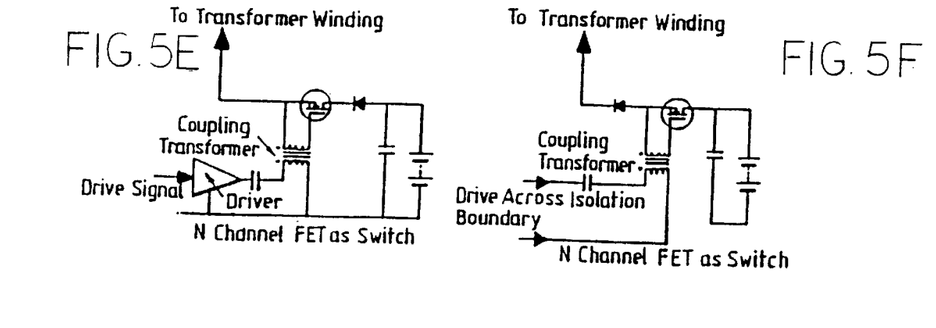
Figure 6A:
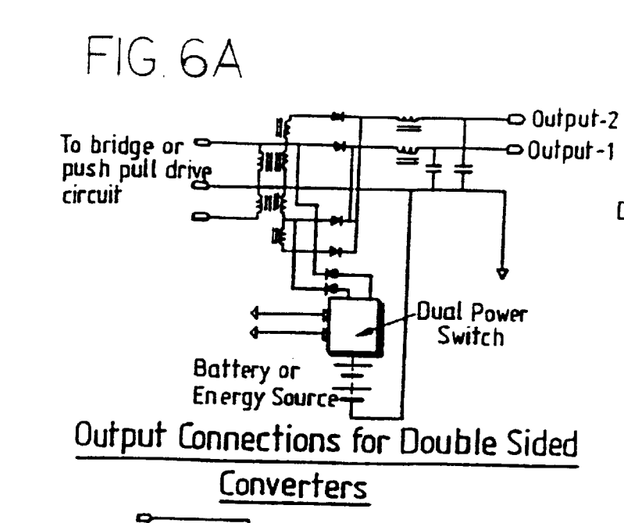
Figure 6B:
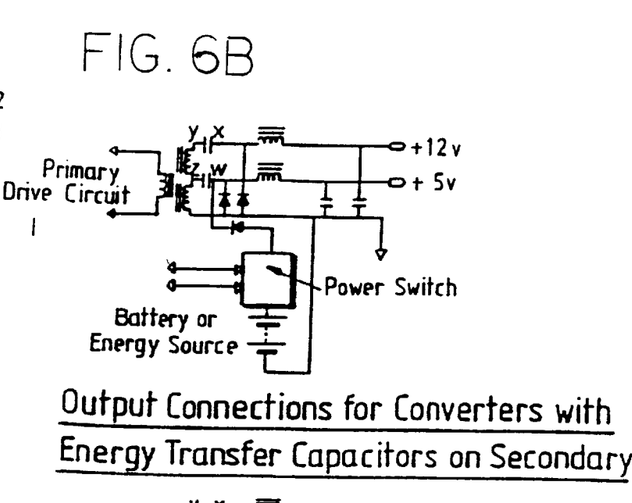
Figure 6C:
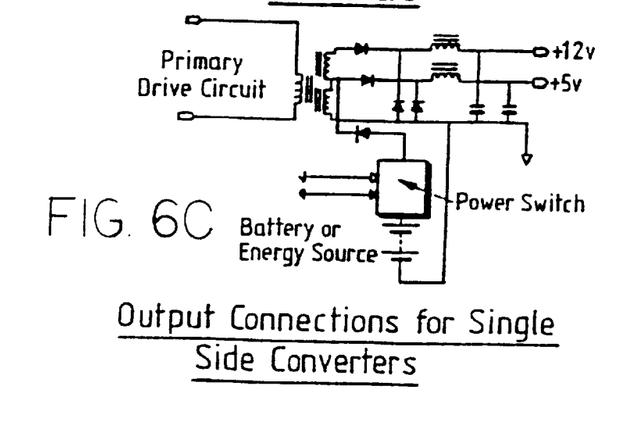
Figure 6D:
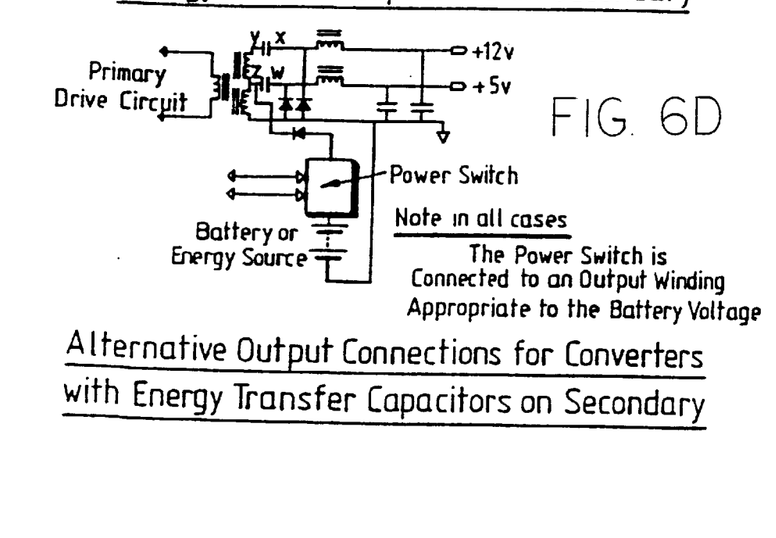
Figure 6E:
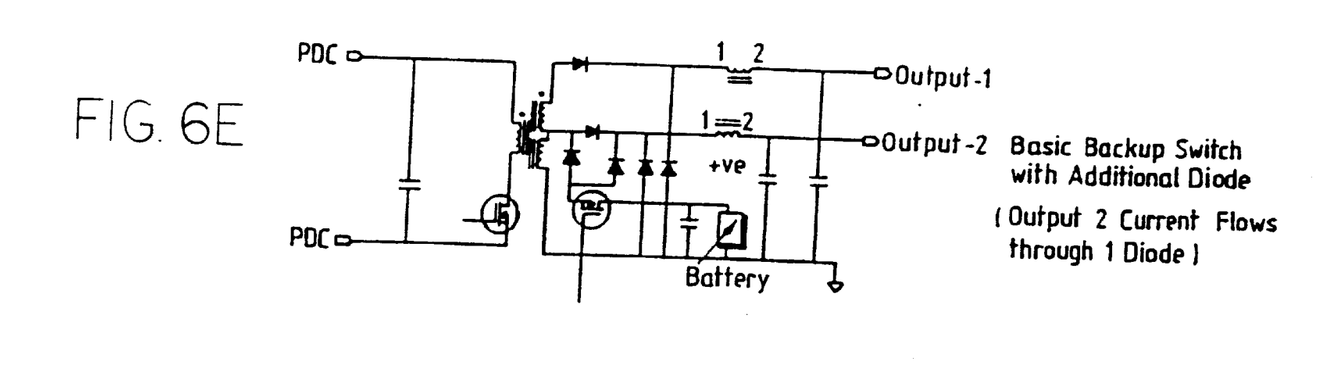
Figure 6F:
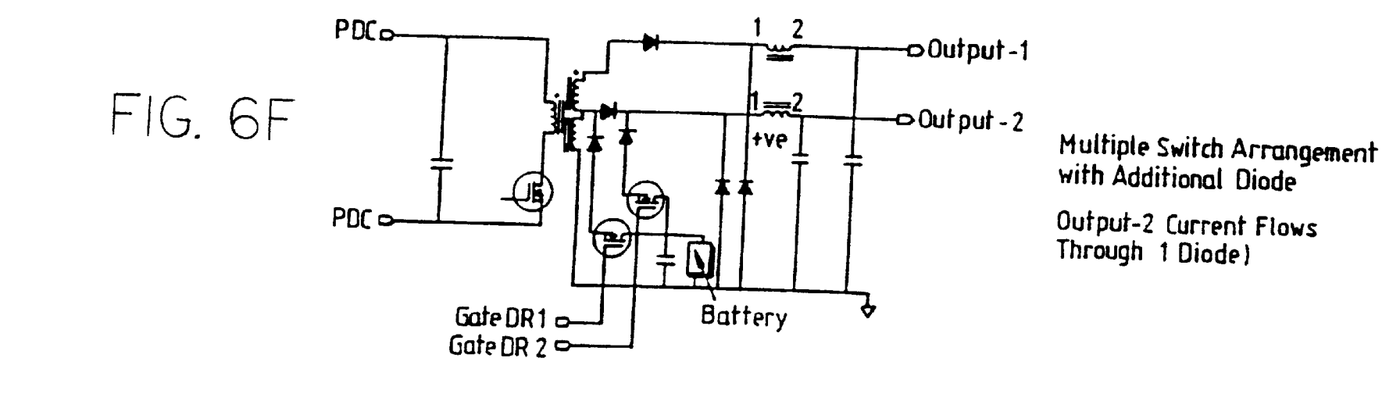

There is shown in FIG. 4 a modification of the power supply of FIG. 1. In the supply of FIG. 4, the pulse width modulation controller 8 is arranged on the secondary side of the transformer 5 and is coupled directly to the power switch 11 of the auxiliary power supply and indirectly, through an isolation crossing 20, to the power switch of the unit 3.

There is shown in FIGS. 5(*a*) to 5(*f*) six alternative possible circuit arrangements for the auxiliary power switch 11 for use with the embodiments of FIGS. 1, 3 and 4. Of these, use of the power switch circuit arrangement shown in FIG. 5(*f*) in the supply of FIG. 1 (as an alternative to the power switch circuit arrangement shown in FIG. 3) may considerably simplify the overall circuitry as there is no requirement for an additional isolation crossing, and control signals from the pulse width modulation controller 8 may be coupled directly to the power switch.

The embodiments described above are not limited to use with transformer secondary side circuits of the configuration shown in FIG. 1. Whilst FIG. 6(*c*) shows the configuration of FIG. 1 (with a number of components omitted for simplicity), FIGS. 6(*a*), (*b*) (*d*), (*e*) and (*f*) show alternative configurations to which the above described automatic uninterruptible power supply principle can be applied. In particular, FIGS. 6(*b*) and (*d*) show possible configurations with energy transfer capacitors Y-X and Z-W coupled to the secondary windings. Examples of such configurations are the Cuk and inverse Sepic converters. In FIGS. 6(*e*) and 6(*f*) the diode 12 of FIG. 6(*c*) is supplemented with an additional diode in parallel but with its cathode connected to the output side of the rectifying diode in the line from the transformer tap to output_1. The result of this is that the power path from the FET 19 is split and the current which emerges from output_1 traverses only a single diode as a result of which there is a greatly reduced power loss, whilst the current which emerges from output_2 comes from the transformer via the same circuit as previously. This leads to a reduced requirement for heat dissipation from the heat sink at the output side of the transformer. With the additional diode of FIG. 6(*e*) it becomes possible to supply each with parallel connected FET switches. This is shown in FIG. 6(*f*). The additional FET which is connected to output_1, after the rectifying diode, is subjected to lower voltage stresses due to the clamping action of the normal free-wheeling diode so that it may be possible to use a lower on-resistance FET device which achieves better efficiency, and is generally cheaper, than the higher on-resistance higher voltage FET. The configurations of FIGS. 6(*e*) and 6(*f*) may require that output_1 and output_2 have separate regulation and filter circuits.

Figure 7A:
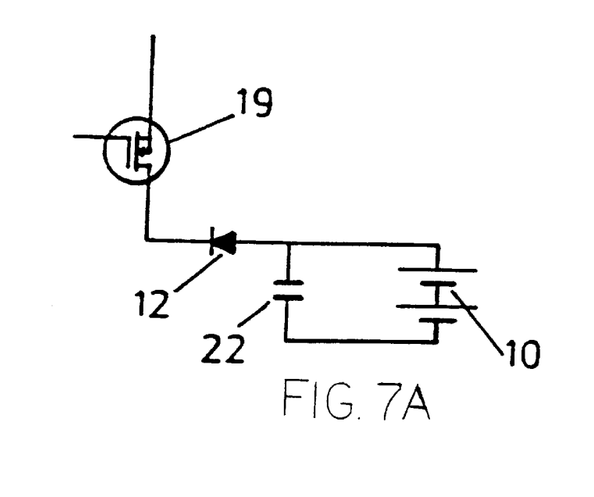
Figure 7B:
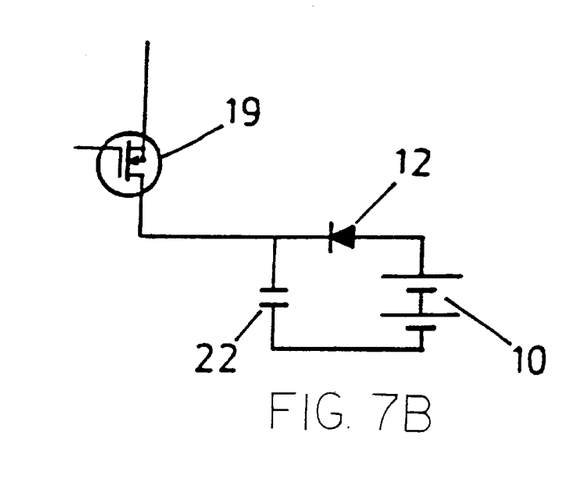

In the embodiments of the invention described above, the battery capacitor 22 is coupled directly across the terminals of the battery 10. For example, FIG. 7(*a*) illustrates one such arrangement where the FET 19 is coupled between the secondary winding of the transformer and the diode 12. However, FIG. 7(*b*) shows an alternative circuit configuration where the diode 12 is coupled between the battery 10 and the battery capacitor 22. In this configuration, the capacitor 22 is charged to a higher voltage than that at which the battery 10 is maintained when the AC supply is maintained and the diode 12 is reverse biased. In particular, the battery capacitor is charged to the peak voltage on the secondary winding via a peak charging circuit. When the AC supply fails and the diode 12 becomes forward biased, the battery 10 and capacitor 22 act as described above to provide power to the secondary winding 6 of the transformer 5.

A first advantage of the configuration of FIG. 7(*b*) is that the diode 12 is required to handle a comparatively smooth DC current in its conducting state and not the high current pulses produced using the configuration of FIG. 7(*a*). Thus, the diode can be made smaller and cheaper and, moreover, can be positioned remotely from the high power components of the power supply (e.g. together with a battery pack) because it forms part of the DC circuit. Whilst it may be necessary to provide a battery capacitor 22 having a higher voltage-rating, this is not a serious limitation.

Figure 7C:
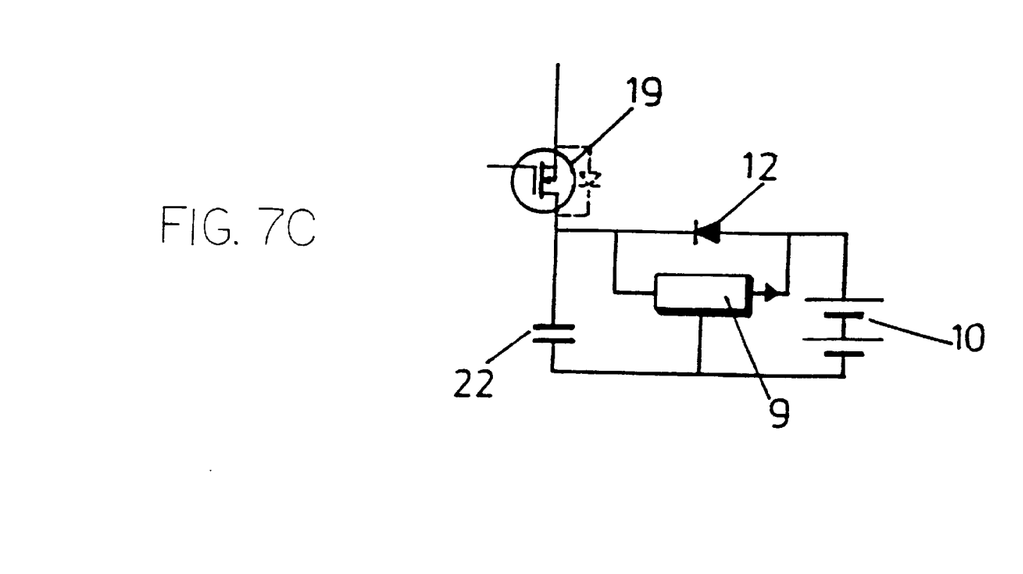

A second advantage is illustrated in FIG. 7(c) and involves coupling the battery charger 9 between the battery capacitor 22 and the battery 10. As the battery capacitor 22 is charged to a higher voltage then the battery 10, the battery charging current can be drawn from the capacitor 22. Thus, there is no need for additional wiring, and an additional winding coupled to the output, to provide charging current to the battery charger 9.

All of the arrangements shown in FIG. 6 are based upon so-called 'forward' topologies and rely upon inductors in the output circuit and the transfer of power during the 'on' time of the pulse width modulator. However, there is a further class of converters which do not require discrete output inductors and in which energy is stored in the transformer (more correctly termed a 'coupled inductor' for this application) during the pulse width modulator 'on' time and is transferred to the output during the 'off' time. This class of converters includes the 'fly-back' or 'buck-boost' converter and the 'sepic' converter.

Figure 8:
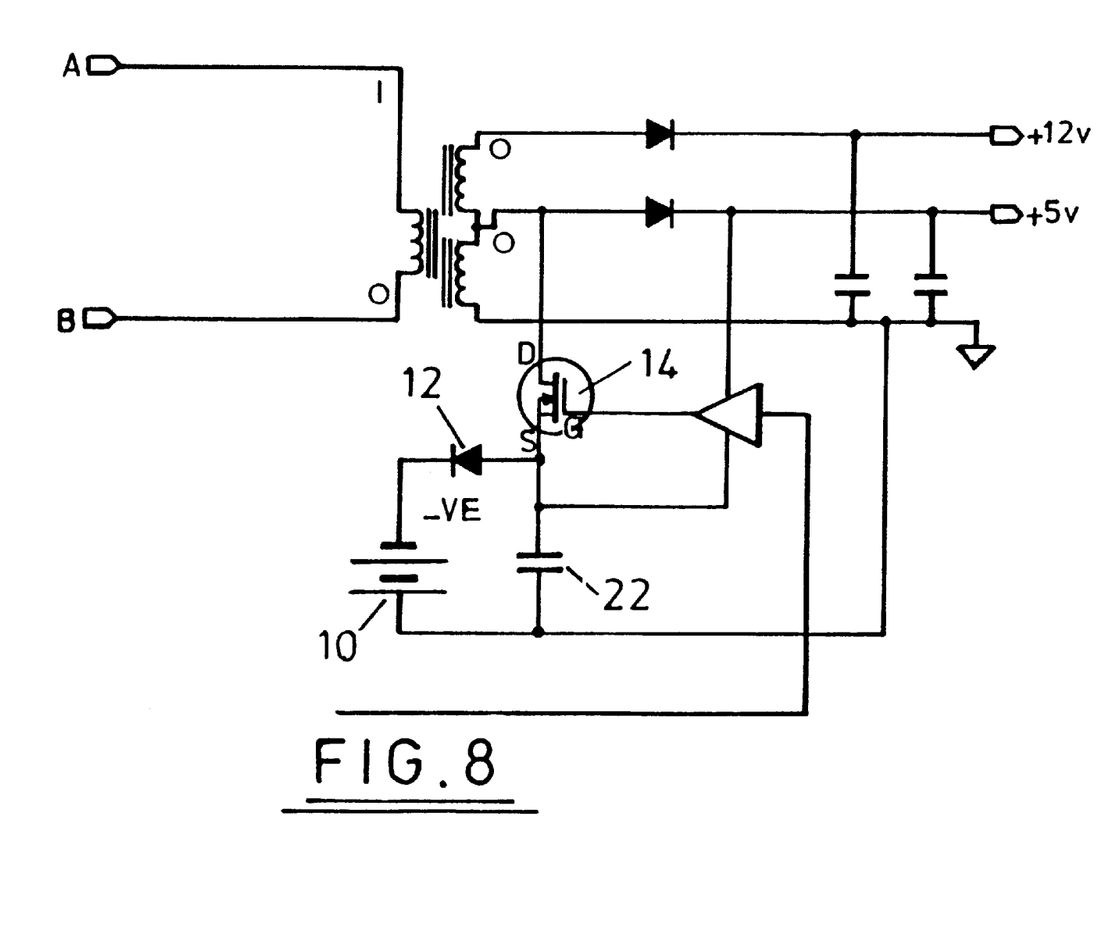
FIG. 8 shows a further alternative configuration for the transformer secondary side circuit of the power supplies of FIGS. 1 and 4.

An important distinction when designing automatic switching circuitry for the fly-back class of converter is that the output polarity is reversed with respect to the battery and the battery must be connected in a negative configuration to obtain positive voltage outputs. FIG. 8 illustrates a possible secondary side configuration based upon a flyback converter where the switching diode 12 is coupled between the battery 10 and the battery capacitor 22. Note that the source of the power switch is connected to a fixed voltage point and the switch can be driven without a level shift transformer (c.f. the circuit of FIG. 3).

Figure 9:
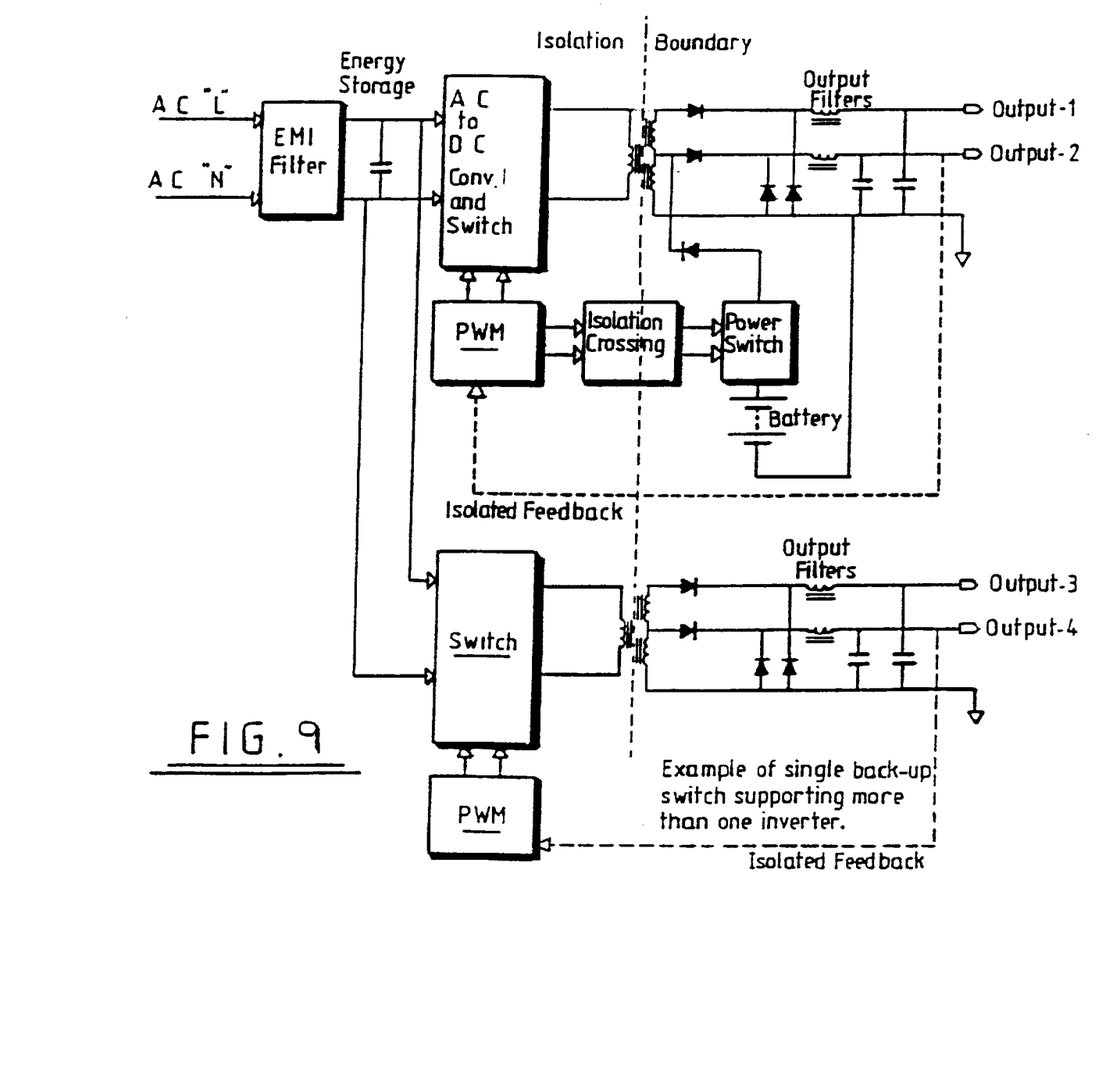
FIG. 9 illustrates a modification of the power supply of FIG. 1.

It will be appreciated that various modifications may be made to the above described embodiments without departing from the scope of the present invention. For example, certain components of the supply may be mounted externally of the device to be powered by the supply. In particular, where the battery is necessarily large in order to provide prolonged back-up it may be mounted externally. In a further modification, the battery may be a standard non-rechargeable battery in which case the battery charging circuitry described above is not required. FIG. 9 illustrates a particular modification where the UPS of FIG. 1 additionally drives a further independent inverter and power supply unit via the high voltage energy store on the primary side of the main transformer. In this case only a single back-up battery and power switch is required to maintain the various outputs from the two power supply units because as previously explained the main transformer charges the primary side storage capacitor at least partially even during battery back-up operation and the inverter of switch unit 3 is intentionally kept running at all times and functions as a synchronous rectifier to thereby control charge storage in the capacitor. Of course further additional independent power supply units may be connected in parallel with the primary energy storage capacitor.

We claim:

1. An uninterruptible power supply for powering an electrical device, said uninterruptible power supply comprising:

an input for receiving AC power;

a DC output;

a transformer having a primary winding and a secondary winding;

a filter coupled to the secondary winding and to the DC output;

an AC to DC converter coupled to said input and receiving power from said input the AC to DC converter including a rectifier;

an inverter coupled to the AC to DC converter and to the primary winding, the inverter including a first ON/OFF switch providing power to the primary winding in response to DC power received from the AC to DC converter, the first ON/OFF switch having an ON/OFF duty cycle controlled in response to a controller to maintain a regulated voltage at the DC output and to generate a chopped DC voltage of amplitude $V_s$ at the secondary winding;

an auxiliary back-up power supply, the auxiliary back-up power supply including:

a battery having first and second battery terminals and operable at a voltage $V_b$ across the first and second battery terminals, a back-up battery capacitor having first and second leads coupled to the first and second battery terminals, respectively, a second ON/OFF switch connected between the first lead of the capacitor and the secondary winding of the transformer, the second ON/OFF switch including a FET that is capable of delivering energy to the back-up battery capacitor when voltage amplitude $V_s$ is greater than voltage amplitude $V_b$, an isolation circuit coupled to the second ON/OFF switch and delivering a drive signal to the second ON/OFF switch, a diode isolation circuit connected between the first lead of the capacitor and the battery, the diode isolation circuit being in a non-conducting state when voltage amplitude $V_s$ is greater than voltage amplitude $V_b$ being in a conducting state when voltage amplitude $V_b$ is greater than voltage amplitude $V_s$, and a battery charger connected in parallel with the diode isolation circuit between the first lead of the back-up battery capacitor and the battery and charging the battery in response to power received at the first lead of the back-up battery capacitor.

2. An uninterruptible power supply as claimed in claim 1, wherein the battery charger includes a peak charging circuit.

3. An uninterruptible power supply as claimed in claim 1 or 2, wherein the second ON/OFF switch is in the form of a MOSFET.

4. An uninterruptible power supply as claimed in claim 3, further comprising the controller and wherein the controller is connected to the isolation circuit and drives the first and second ON/OFF switches in synchrony.

5. An uninterruptible power supply as claimed in claim 4, wherein the controller is a pulse-width modulator controlled by a deviation from a reference value of the regulated voltage at the DC output of the uninterruptible power supply.

6. An uninterruptible power supply as claimed in claim 5, wherein a maximum duty ratio of the controller during operation at a minimum level of voltage at the input is less than the minimum duty ratio of the controller when operating on the auxiliary back-up power supply with the battery fully charged at the $V_b$ voltage level.

7. An uninterruptible power supply as claimed in claim 6, further comprising a thermistor disposed between the rectifier of the AC to DC converter and the inverter.

8. An uninterruptible power supply as claimed in claim 1 or 2, further comprising the controller and wherein the controller is connected to the isolation circuit and drives the first and second ON/OFF switches in synchrony.

9. An uninterruptible power supply as claimed in claim 1, wherein the diode isolation circuit is coupled to the secondary winding and supplies current through the diode isolation circuit to the secondary winding other than through the transformer.

10. An uninterruptible power supply comprising:

a power supply output having an output voltage;

an AC input for receiving AC power;

an AC to DC converter coupled to the AC input and arranged to generate DC power at an output of the converter in response to AC power received from the AC input;

a transformer having a primary winding and a secondary winding coupled to deliver power from the secondary winding to the power supply output;

a switch coupled to control power transfer from the output of the AC to DC converter to the primary winding of the transformer and produce a chopped DC voltage, having an amplitude $V_s$, across the secondary winding of the transformer;

an auxiliary power supply providing a DC output voltage having an amplitude $V_b$; and a diode isolation circuit coupled between the auxiliary power supply and the secondary winding, the diode isolation circuit being in a non-conductive state to isolate the energy store from the secondary winding when $V_s$ is greater than $V_b$ and in a conductive state when $V_b$ is greater than $V_s$ to supply current through the diode isolation circuit to the secondary winding other than through the transformer.

11. An uninterruptible power supply comprising:

a power supply output having an output voltage;

a transformer having a primary winding and a secondary winding coupled to deliver power from the secondary winding to the power supply output;

a first switch circuit connected to the primary winding and providing power to the primary winding in response to an AC power source, the power applied to the primary winding inducing a first voltage across the secondary winding;

an auxiliary power supply providing a DC output at a second voltage less than the first voltage;

a second switch circuit coupled between the auxiliary power supply and the secondary winding, the second switch being operated under common control with the first switch;

a diode isolation circuit coupled in series with the second switch circuit between the auxiliary power supply and the secondary winding, the diode isolation circuit being in a non-conductive state to isolate the energy store from the secondary winding when the first voltage is greater than the second voltage and in a conductive state when the second voltage is greater than the first voltage and the second switch is closed to supply current through the diode isolation circuit to the secondary winding other than through the transformer when sufficient power is not available from the AC power source to maintain the first voltage greater than the second voltage while the second switch is closed.

12. An uninterruptible power supply comprising:

a power supply output having an output voltage;

an AC input for receiving AC utility power;

an AC to DC converter coupled to the AC input and arranged to generate DC power at an output of the converter;

a transformer having a primary winding and a secondary winding coupled to deliver power from the secondary winding to the power supply output;

an inverter coupled between the AC to DC converter and the primary winding of the transformer and supplying power to the primary winding, the inverter being arranged to supply a chopped DC voltage across the primary winding, the chopped DC voltage across the primary winding causing a corresponding chopped DC voltage, having an amplitude $V_s$, to be generated across the secondary winding of the transformer;

an auxiliary power supply including an energy store having a supply terminal and providing an output voltage $V_b$ at the supply terminal; and a diode isolation circuit coupled between the supply terminal of the energy store and said secondary winding, wherein the diode isolation circuit is arranged to be in a non-conductive state to isolate the energy store from the secondary winding when $V_s$ is greater than $V_b$ and in a conductive state when $V_b$ is greater than $V_s$ to supply current through the diode isolation circuit to the secondary winding other than through the primary winding.

* * * * *